US008645594B2

(12) United States Patent
Foong et al.

(10) Patent No.: US 8,645,594 B2
(45) Date of Patent: Feb. 4, 2014

(54) DRIVER-ASSISTED BASE ADDRESS REGISTER MAPPING

(75) Inventors: Annie Foong, Aloha, OR (US); Pak-Lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/538,221

(22) Filed: Jun. 29, 2012

(65) Prior Publication Data

US 2014/0006659 A1    Jan. 2, 2014

(51) Int. Cl.
*G06F 13/38*    (2006.01)

(52) U.S. Cl.
USPC .............................................. 710/38; 710/31

(58) Field of Classification Search
None
See application file for complete search history.

(56) References Cited

U.S. PATENT DOCUMENTS

| | | | | |
|---|---|---|---|---|
| 7,519,852 B2* | 4/2009 | Carver et al. | ................... | 714/6.1 |
| 7,752,360 B2* | 7/2010 | Galles | ............................. | 710/62 |
| 8,312,187 B2* | 11/2012 | Rodrigues et al. | ............... | 710/52 |
| 2008/0288661 A1* | 11/2008 | Galles | ................................ | 710/3 |
| 2010/0146222 A1* | 6/2010 | Cox et al. | ....................... | 711/154 |
| 2012/0030401 A1* | 2/2012 | Cowan et al. | .................. | 710/313 |
| 2012/0185632 A1* | 7/2012 | Lais et al. | ...................... | 710/308 |
| 2013/0145052 A1* | 6/2013 | Aiken et al. | ....................... | 710/9 |

* cited by examiner

*Primary Examiner* — Cheng-Yuan Tseng
(74) *Attorney, Agent, or Firm* — Chapin IP Law, LLC

(57) ABSTRACT

Techniques herein include systems and methods for driver-assisted BAR mapping that virtualize PCI functions, but without virtualizing the storage media itself. Such techniques make use of unused BARs (Base Address Registers) of a master (Operating system-facing) device to gain access to other PCIe logical instances, while still exposing only a single PCIe function (connection or channel) to system software. This technique provides a new concept of logical PCIe device instances through BAR mapping by making use of unused BARs to extend access to any number of PCIe instances or memory-mapped I/O devices behind a master device such that only a single PCIe function is exposed to system software. Embodiments can thus extend access to one or more additional storage devices through one level of BAR indirection. As a result, such techniques and embodiments enable the multiplication of storage capacity and performance through the aggregation of multiple, similar hardware components.

20 Claims, 3 Drawing Sheets

DRIVER-ASSISTED BASE ADDRESS REGISTER MAPPING

TECHNICAL FIELD

Embodiments of the present disclosure relate generally to computer bus technology and communicating with data storage devices via a system Input/Output (I/O) bus.

BACKGROUND

A computer bus, within a computer system, functions by transferring data among and between components of the computer system. This often involves moving data between a computer's Central Processing Unit (CPU) and memory or data storage, but such data transfers also include moving data among internal and peripheral components such as video cards, network interface cards, external hard drives, Universal Serial Bus (USB) flash drives, printers, keyboards, and so forth. Different types of components can interface with the computer bus using different protocols and/or different connections. A storage device, for example a Solid State Drive (SSD), can connect to a computer's host I/O bus, such as a Peripheral Component Interconnect Express (PCIe) computer expansion bus, or similar computer bus. Many fast storage devices are now connecting directly to the PCIe bus or other system I/O bus.

DESCRIPTION OF THE EMBODIMENTS

Figure 1:
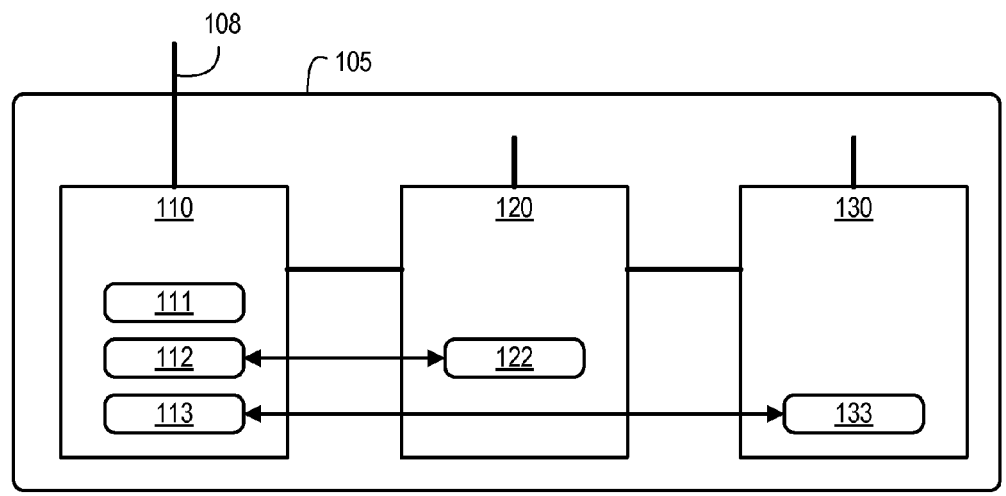
FIG. 1 is a block diagram of an example storage aggregation unit.

Multiple SSDs presented to an operating system (whether directly attached to the PCIe bus or grouped on a single framework) are presented as different "PCIe functions." A PCIe function is a connection or communication line to a drive or device, that is, a channel for the CPU to talk to the media, similar to a telephone call.

Thus, adding a multi-device volume is conventionally equivalent to adding independent PCIe devices and instances of drivers. As a consequence it becomes difficult to maintain drive integrity as a unit (if even possible). The internal configuration of a multi-device drive volume becomes fully exposed to users making it prone to mis-configuration. Furthermore, PCIe devices are enumerated in random order, making it non-trivial to implement boot sequencing for such multi-device drive volumes. Finally, some operating systems (e.g. Windows Storport architecture) do not allow storage drivers to be aggregated, making it impossible for drive vendors to deliver more performance through simple aggregation of devices of similar stock keeping units (SKUs) or model numbers, and/or that have similar application-specific integrated circuits (ASICs). Thus, conventionally it is not possible to increase drive performance simply by replicating a number of devices in a given volume.

Techniques disclosed herein include virtualizing PCI functions, but without virtualizing the storage media itself. This is accomplished with the creation of driver-assisted Base Address Register (BAR) mapping. This technique makes use of unused BARs of a master (Operating system-facing) device to gain access to other PCIe logical instances, while still exposing only a single PCIe function (connection or channel) to system software. This technique provides a new concept of logical PCIe device instances through BAR mapping by making use of unused BARs to extend access to any number of PCIe instances behind a master device such that only a single PCIe function is exposed to system software. Embodiments can thus extend access to one or more additional storage devices through one level of BAR indirection. Embodiments can use a device-aware driver that maps or offsets data storage locations to an appropriate address so as to gain access to specific devices within a multi-device volume. Accordingly, this driver can "pre-map" a relationship between logical block addressing (LBA) and Memory-mapped input/output (MMIO) address space to gain access to specific devices, with routing decided typically once and early in the host. As a result, such techniques and embodiments enable the multiplication of storage capacity and performance through the aggregation of multiple, similar hardware components.

Without such techniques, all intelligence would need to be embedded in differently identified devices. For example, PCIe SSDs would require higher-powered front-end processors in the device to deliver more performance. Techniques herein, however, can reduce costs by removing a need for extra Host Bus Adaptors (HBA)s. Additionally, simple address decoding is enabled on devices by making routing decisions once only in the host (mapping LBAs to addresses, which the host must already do at least once). Intelligence decision-making is thus moved to the driver from the host processor.

Techniques disclosed herein include systems and methods for driver assisted Base Address Register (BAR) mapping. Such techniques enable increased storage capacity, using solid-state drives (SSDs) and other storage devices, without complicating operating system processing. This includes SSDs attached via any memory-mapped I/O interconnect, including, but not limited to, Peripheral Component Interconnect Express (PCIe). PCIe BAR mapping involves mapping a PCIe device into the memory-mapped address space (or other I/O address space) of the computer system. This mapping enables the computer system to address PCIe devices. Drivers or an operating system can program the Base Address Registers. During system startup, PCIe devices are usually identified, numbered and then addressed. The Peripheral Component Interconnect Special Interest Group (PCI-SIG) provides specifications for PCIe and other computer bus technologies (pcisig.com).

PCIe is a system I/O bus, and provides a generic interface that enables a CPU to talk to devices such as storage devices, media reading devices, video devices, USB drives, etc. Typically, a host bus adaptor (HBA) in a computer system interfaces to a storage bus such as Serial Attached SCSI (SAS) (SCSI is Small Computer System Interface) or Serial Advanced Technology Attachment (SATA)). Thus, the HBA acts as a device manager interface to a corresponding operating system or computer bus of an operating system. In other words, conventional storage devices attach to a host via the HBA, which functions as a proxy between storage devices and the host bus. The HBA can be beneficial as a middle management device to consolidate and aggregate information before sending it upward, that is, towards a CPU. Note that for simplicity, examples within this disclosure focus on one particular reference system I/O bus, namely PCIe, but the techniques disclosed herein can apply to other system I/O bus technologies.

If storage devices are coupled to the system I/O bus instead of being coupled to a storage bus via an HBA, then a bus manager in the operating system must handle storage errors. In contrast, with a HBA, this bus manager typically handles/corrects/manages errors on the attached storage device so that these errors are not visible or reported to the CPU, thus easing a computing load of the host. In contrast, the operating system (OS) of a computing device handles all PCIe errors. Operating systems have been conventionally designed to work with a middle manager module to deal with data issues. Such operating system functionality can create a problem when using PCIe devices, especially as the number of attached PCIe devices (including storage devices) increases.

Solid-state drives (SSDs) have become increasingly popular. Hybrid drives are also in use. A hybrid drive is a type of hard disk drive that has embedded memory comprised of non-volatile memory and a rotating media. Such hybrid drives can speed data accesses. Conventionally, storage devices (such as SSDs and hybrid drives) are directly connected to, or attached to, the system I/O bus (for example, PCIe). Such a direct connection provides a beneficial fast connection.

Discoveries herein have identified challenges with using storage devices coupled directly to the system I/O bus. SSDs typically have a significantly smaller storage capacity as compared to a hard disk drive. Thus, enabling SSD storage capacity and/or bandwidth to scale with a number of devices is beneficial. What is also beneficial is that the ability to provide capacity multiplies based off the same basic single SSD, which is helpful for streamlining productization. One way to add more bandwidth is to combine multiple SSDs in a single device. For example, multiple SSDs can be stacked together within a single housing, framework, or unit so that it appears to a user as a single device. By way of a non-limiting example, multiple SSDs can be arranged within a housing unit have a form factor of a conventional hard disk drive. One challenge is that despite having multiple SSDs packaged in a single device framework, a given operating system would nevertheless identify the single device as having multiple PCIe functions or PCIe connections. In other words, the operating system would not identify the SSD aggregation unit as a single PCIe device, but would instead identify each individual SSD within the aggregation unit. Such individual identification is a consequence of conventional system software configured to associate one instance of a device HBA driver per PCIe device. Multiple disks may be attached to the HBA, but there is still a single instance of driver managing multiple disks. With PCIe devices, however, there is no HBA to interface with the operating system.

While omitting the HBA is one reason SSDs can have faster transfer speeds, identifying the unit as having multiple distinct SSDs is not beneficial for a least a couple of reasons. One reason is that users of the storage aggregation unit could inadvertently or purposely turn off one or more of the individual PCIe devices. Another reason is that a graphical user interface of an OS that identifies multiple different drives to a user could be a confusing display. While operating systems are configured to interface with each PCIe device, it is generally more advantageous to present the group of SSD devices as a single volume to the operating system and user. Also, having the operating system handle management of multiple SSDs can create a processing burden that hinders the CPU.

Referring now to FIG. 1, storage aggregation unit 105 includes PCIe devices 110, 120, and 130. Note that for convenience, devices 110, 120, and 130 are referred to as PCIe devices. This designation, however, is not limiting in that devices 110, 120, and 130 can be any memory-mapped input/output devices, that is, any device that can be accessed through a memory-mapped address and by way of any computer bus protocol or computer expansion bus protocol. In other words, memory-mapped I/O devices have the capacity to hold any generically unique addresses for other devices, so that the master device can route transactions accordingly. In contrast, some devices, such as SATA devices are simply named and do not maintain address registers in the device itself.

Continuing with FIG. 1, in some embodiments, these PCIe devices can be selected as PCIe SSDs. Storage aggregation unit connects to a host or computer or operating system via PCIe bus 108 or other bussing architecture. PCIe device 110 includes three BARS 111, 112, and 113. PCIe devices 120 and 130 also include three bars, but for convenience only bar 122 of PCIe device 120 is shown, and only BAR 133 of PCIe device 130 is shown. In this example, a host/operating system sees one PCIe function with one configuration space (the master PCIe device), and three MMIO ranges: BAR 0/1 (111), BAR 2/3 (112), and BAR 4/5 (113). In this configuration, BAR 0/1 is used for accessing storage on PCIe device 110 itself, while BAR 2/3 is used to access first slave PCIe device 120, while BAR 4/5 (113) is used to access second slave PCIe device 130. In operation, when the host tries to access physical address identified by BAR 111, then a driver for storage aggregation unit 105 grants access to PCIe drive 110 at a corresponding location. If, however, the host tries to access a physical address identified with BAR 112, then the driver redirects the access request to PCIe device 120.

Software is typically used to program a given PCIe device or PCIe function. This involves using a driver (BAR driver) to program a value in a given register, after such programming an I/O device can perform according to registered values. Programming a register involves knowing which register to program on a given device. For example, on a given computer system there can be many PCIe devices (graphics card, video card, storage, etc. . . . ). An operating system typically identifies multiple devices during startup. During a boot sequence the operating system recognizes devices and assigns a dynamic address range to each of these devices. For example, a first PCIe device is assigned address block 1-5, a second PCIe device is assigned address block 6-22, and so on. These address blocks are the base address registers. Finding PCIe devices, assigning an address range, and programming respective address ranges is accomplished with the BAR on a given device. With techniques herein, however, multiple PCIe devices are mapped to one master device. A driver of a storage aggregation unit functions to match multiple devices into one, that is, the driver can map an address range of multiple devices into one address range.

In general, PCIe devices provide three address ranges. PCIe functionality allows memory-mapped I/O access to device control registers of up to six non-contiguously mapped memory regions, via six 32-bit BARs. At least one BAR is required for 32-bit operating systems, and two BARs are required for 64-bit operating systems. For 64-bit devices, these can be identified as Bar 0/1, Bar 2/3, and Bar 4/5. A BAR is a pointer to a base address as well as identifying a length. Thus, a BAR identifies a starting address and a length. Across different BARs addressing can be discontinuous, but within a bar it is continuous. Typically most devices use only one address range of the three or so available address ranges. For example, conventional 64-bit operating systems typically uses only BAR 0/1 for I/O operations, while the remaining BAR spaces are left unused.

Techniques disclosed herein make use of the multiple PCIe address ranges. Thus, a first PCIe (master) SSD uses its first BAR for storing data in itself, and then uses the second and/or third BARs to access the BARs of additional or slave PCIe devices. Having multiple BAR ranges provides the driver a way to access registers on a device through address spaces. From the operation system perspective, the operating system is simply writing to an address or to an array. The operating system does not need to know how the storage aggregation unit redirects an address request. Note that these are physical address on a given system—not a virtualized address. As such, all these address should be unique because they uniquely represent registers on the device across the entire system. Thus there should be no overlap with other PCIe devices as there is typically no need for address translation. Also, from the operating system perspective, the storage aggregation unit simply has or shows a relatively huge address range compared to other PCIe devices.

As noted, PCIe device typically have three BARs, but only need one of those BARs. Thus, after using one BAR, the other two BARs can be used for referencing slave devices. Each of those slave devices can in turn function as a master PCIe device for referencing an additional two slave devices, as well as using one BAR for storing data on itself. This process can continue with any number of SSDs. Such aggregation functions better when using contiguous address spaces. Thus one master can point to several slaves, and each slave can point to additional slaves.

Figure 2:
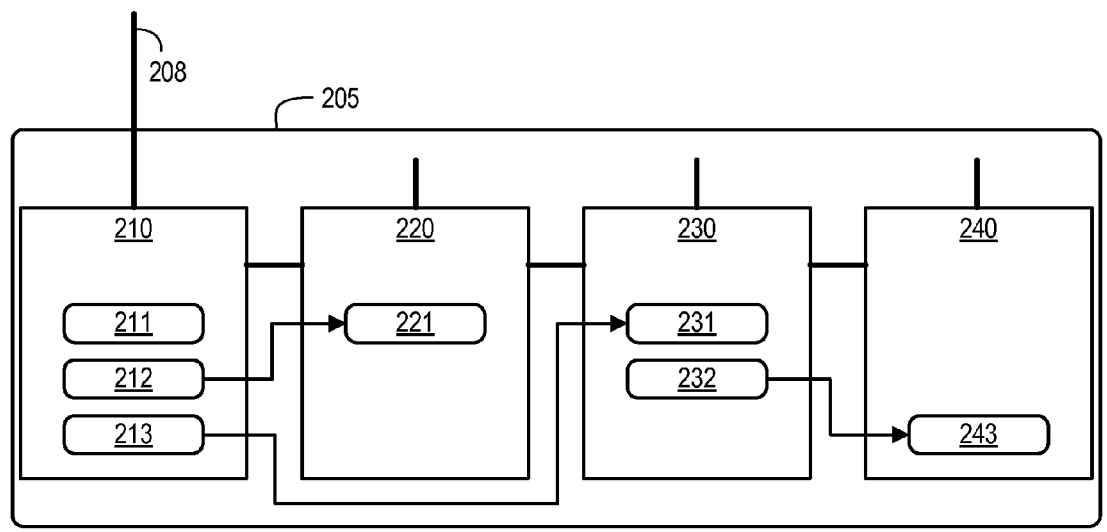
FIG. 2 is a block diagram of an example storage aggregation unit.

Referring now to FIG. 2, a storage aggregation unit diagram shows how it is possible to scale beyond three PCIe devices. Such scaling functions better when the BAR space of additional slave devices exists in contiguous MMIO space. Storage aggregation unit 205 includes PCIe devices 210, 220, 230, and 240. Storage aggregation unit connects to a host via PCIe bus 208. PCIe device 210 includes three BARS 211, 212, and 213. PCIe devices 220, 230, and 240 also include three bars, but for convenience only show relevant BARs. Note that BAR 212 is configured to redirect to BAR 221 or PCIe device 220, while BAR 213 is configured to redirect to BAR 231 of PCIe device 230. BAR 232 of PCIe device 230 is configured to redirect to BAR 243 of PCIe device 240. Note that such redirection is merely exemplary, and any given BAR can be used to reference another PCIe device and/or BAR from that PCIe device. As long as a given device does not use all its respective BARs for storing data, then additional BARs can be used for redirecting to additional slave devices.

Implementation can be further simplified by assuming that BAR sizes of additional slave devices are equal. This is not a limiting assumption, since such a design can scale performance through replicating devices of similar models. A constant size can be reflected through PCIe extended capability registers (Slave BAR size) of the master device. If each slave has a different BAR size, then a host table indexed by a Slave BAR Size register can hold a different size per slave. The device-aware (of a given class code) driver would then know to access Slave n, through the appropriate offset from the top a respective BAR of a master or slave PCIe device. As long as there is an unused BAR pair on the Master, then n slaves can be accessed off of that BAR. Any sub-decoding can be executed in slave or master devices.

Figure 3:
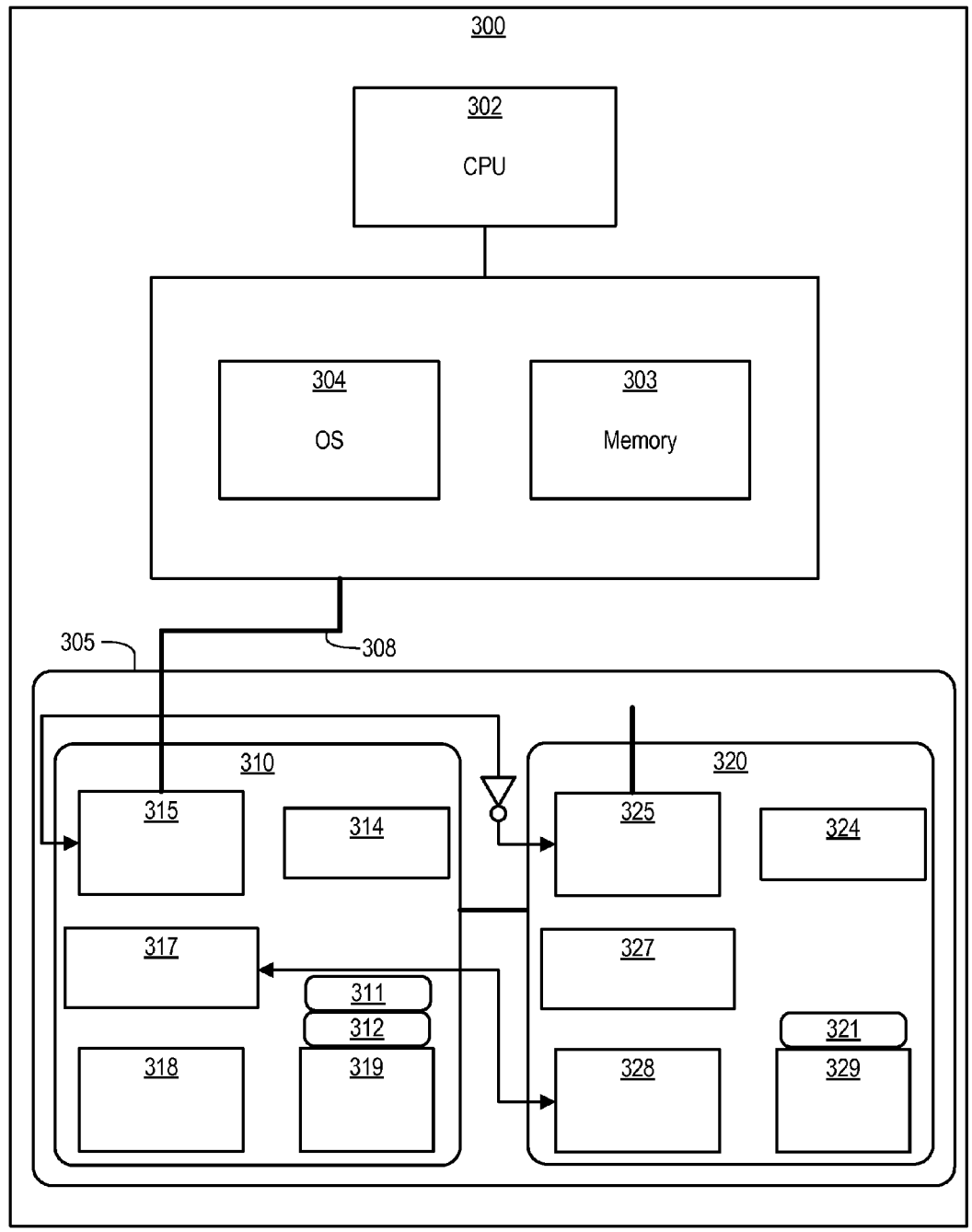
FIG. 3 is a block diagram of an example storage aggregation unit and associated computer system.

FIG. 3 is a diagram illustrating internal details of a PCIe device and corresponding host. Computer system 300 includes CPU 302, memory 303, and operating system 304. Storage aggregation unit 305 connects to the operating system 304 and CPU 302 via PCIe bus 308. Storage aggregation unit 305 includes a first PCIe device 310, and a second PCIe device 320. For simplicity only two PCIe devices are shown, though actual embodiments can include many PCIe devices grouped and interconnected within storage aggregation unit 305.

Each PCIe device (the master and slave) has respective PCIe cores 315 and 325. In this configuration, when PCIe core 315 is enabled, PCIe core 325 can be disabled so that the host sees only one PCIe device. PCIe core 315 is host facing and can implement PCIe semantics, can expose its configuration space 314 to the computer system 300, and can respond to requests to match its address space as determined by its BARs. PCIe devices include respective components including Address Decoder (ingress)/multiplexer (egress) 317 and 327, device internals 318 and 328, configuration space 314 and 324, BARs 311, 312 and 321, and control registers 319 and 329. Note that each PCIe device includes at least three BARs, but these are not shown for convenience in describing embodiments herein.

This example implementation doubles the capacity and performance by aggregating two devices, but while exposing only a single PCIe function to the computer system 300 (host). The PCIe core 315 can be sufficiently resourced (i.e. double the number of lanes) to handle the increased throughput. When viewed externally, only one configuration space 314 and address range is exposed to the host (similar to a standard PCIe device). The Master PCIe device 310 responds to configuration accesses on behalf of the slave(s), and sets a global configuration policy for the entire storage aggregation unit 305. Through its BARs, the master 310 is also responsible for responding to all control register accesses, but forwards the accesses to slave control registers to the corresponding slave device. It is the control registers that can dictate fast path I/O.

Internally the master PCIe device 310 can be identical or similar to slave PCIe device 320, but the slave is mapped off BAR 312 of the master device. A driver (loaded via device or class identification) knows that there are two storage device instances behind the single PCIe function. The Master is responsible for all configuration-specific behavior, such as representing a total storage size of all slaves and its own storage when inquired.

The driver is also aware of total logical block address (LBA) storage range available. The BAR driver can decide LBA mapping to devices. In the simplest case of two devices, the driver can map a first half the LBA range to the master, and second half of the LBA range to the slave. If the LBA falls within the range of the master, then the driver uses BAR 311 to access the master (local) resources of the master itself. Otherwise, the driver would know to use BAR 312. An address decoder then sends all BAR 312 addresses to the slave device on the inbound path. On the outbound path, a MUX multiplexes packets from either the master or slave. A mode selector can be used to optionally turn off the slave mode.

Figure 4:
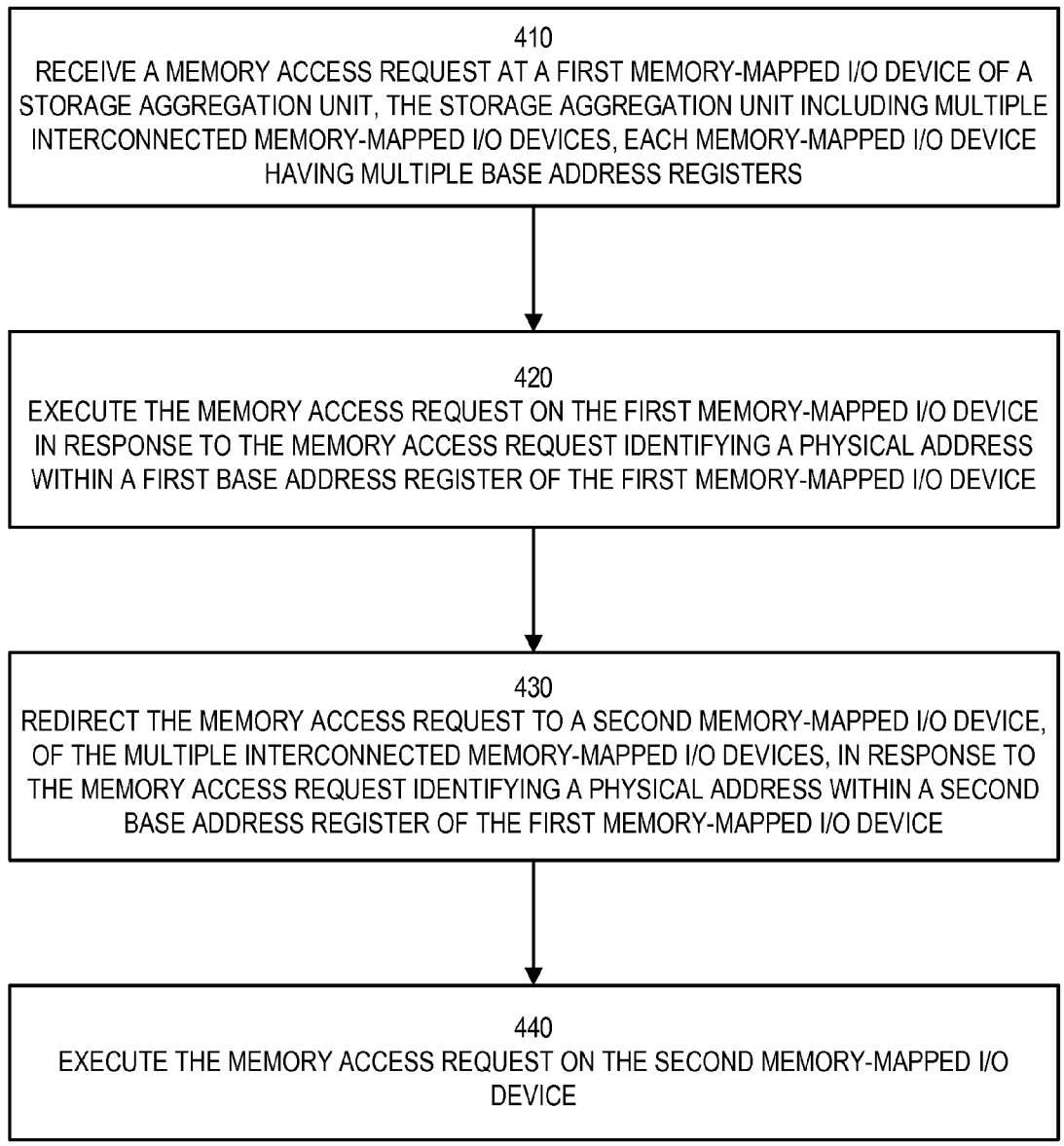
FIG. 4 is a flowchart illustrating an example of a process supporting storage aggregation according to embodiments herein.

FIG. 4 is a flow chart illustrating embodiments disclosed herein. In step 410 a BAR driver receives a memory access request at a first memory-mapped I/O device or Peripheral Component Interconnect Express (PCIe) device of a storage aggregation unit. The storage aggregation unit includes multiple interconnected memory-mapped I/O devices, with each memory-mapped I/O device having multiple Base Address Registers. For example, a housing or framework can include multiple SSDs connected to a single physical interface that connects with a memory-mapped I/O connector or other bus connecter. Note that the interconnection does not mean that every single SSD is directly connected to every other SSD within the unit, but that there are connections sufficient for the master to redirect data access requests to a corresponding SSD.

In step 420, the BAR driver executes the memory access request on the first memory-mapped I/O device in response to the memory access request identifying a physical address within a first Base Address Register of the first memory-mapped I/O device. In other words, a read/write operation identified using a first BAR would be executed on the master device itself.

In step 430, the BAR driver redirects the memory access request to a second memory-mapped I/O device of the multiple interconnected memory-mapped I/O devices. This redirection is in response to the memory access request identifying a physical address within a second Base Address Register of the first memory-mapped I/O device. In step 440, the BAR driver or second memory-mapped I/O device executes this memory access request on the second memory-mapped I/O device In other embodiments, in response to the memory access request identifying a physical address within a third Base Address Register of the first memory-mapped I/O device, the BAR driver redirects the memory access request to a third memory-mapped I/O device, of the multiple interconnected memory-mapped I/O devices, and then executes the memory access request on the second memory-mapped I/O device. Thus the first memory-mapped I/O device can redirect memory access requests to multiple additional storage devices.

In another embodiment, in response to receiving a redirected memory access request at the second memory-mapped I/O device, the redirected memory access request identifies a physical address with a first Base Address Register of the second memory-mapped I/O device, executes the memory access request on the second memory-mapped I/O device. In response to receiving a redirected memory access request at the second memory-mapped I/O device (the redirected memory access request identifying a physical address with a second Base Address Register of the second memory-mapped I/O device), the BAR driver redirects the memory access request to a fourth memory-mapped I/O device, of the multiple interconnected memory-mapped I/O devices, and executes the memory access request on the fourth memory-mapped I/O device.

In another embodiment, in response to receiving a mapping request, at the first memory-mapped I/O (or Peripheral Component Interconnect Express (PCIe) device) of a storage aggregation device, for Base Address Register information corresponding to the first memory-mapped I/O device, the BAR driver identifies an address ranges across three Base Address Registers fro the first memory-mapped I/O device sufficient to map physical data storage addresses from each of the multiple interconnected memory-mapped I/O devices, with each additional memory-mapped I/O device identified via one level of Base Address Register indirection.

In other embodiments, the mapping request can be received as part of a boot sequence of a corresponding operating system. Also, each interconnected memory-mapped I/O device can be a solid-state drive. The memory access request can be a request to write data at a location identified by one of the multiple Base Address Registers.

Techniques discloses herein can be embodied as an apparatus or system. An example of such a system includes a data storage device. This device includes a storage aggregation unit having multiple memory-mapped I/O devices (such as multiple Peripheral Component Interconnect Express (PCIe) devices) interconnected within the storage aggregation unit. Each memory-mapped I/O device can have multiple Base Address Registers. The storage aggregation unit can include a physical connection interface configured to connect to a computer bus or computer expansion bus such as a PCIe bus. The storage aggregation unit includes a processor and a memory coupled to the processor. The memory stores instructions that, when executed by the processor, causes the storage aggregation unit to perform various operations. These operations include: receiving a memory access request at a first memory-mapped I/O device of the storage aggregation unit; in response to the memory access request identifying a physical address within a first Base Address Register of the first memory-mapped I/O device, executing the memory access request on the first memory-mapped I/O device; and in response to the memory access request identifying a physical address within a second Base Address Register of the first memory-mapped I/O device, redirecting the memory access request to a second memory-mapped I/O device, of the multiple interconnected memory-mapped I/O devices, and executing the memory access request on the second memory-mapped I/O device.

Additional operations include redirecting the memory access request to a third memory-mapped I/O device, of the multiple interconnected memory-mapped I/O devices, and executing the memory access request on the second memory-mapped I/O device in response to the memory access request identifying a physical address within a third Base Address Register of the first memory-mapped I/O device. Also, redirecting memory access request identifying a physical address with a first Base Address Register of the second memory-mapped I/O device, and executing the memory access request on the second memory-mapped I/O device in response to receiving a redirected memory access request at the second memory-mapped I/O device. In response to receiving a redirected memory access request at the second memory-mapped I/O device, the redirected memory access request identifying a physical address with a second Base Address Register of the second memory-mapped I/O device, operations can include redirecting the memory access request to a fourth memory-mapped I/O device, of the multiple interconnected PCIe devices, and executing the memory access request on the fourth memory-mapped I/O device. Additionally, in response to receiving a mapping request, at the first memory-mapped I/O device of a storage aggregation device, for Base Address Register information corresponding to the first memory-mapped I/O device, operations can include identifying address ranges across three Base Address Registers fro the first memory-mapped I/O device sufficient to map physical data storage addresses from each of the multiple interconnected memory-mapped I/O devices, each additional memory-mapped I/O device identified via one level of Base Address Register indirection. The mapping request can be received as part of a boot sequence of an operating system. The interconnected memory-mapped I/O devices can be solid-state drives. Each solid-state drive can be configured with a respective memory-mapped I/O function. The memory access request can be received from a corresponding operating system that recognizes individual memory-mapped I/O device functions without aggregating memory-mapped I/O devices via a central processing unit. The data storage device of claim 1, wherein the memory access request is a request to write data at a location identified by one of the multiple Base Address Registers.

Other embodiments can include a computer program product including a non-transitory computer-storage medium having instructions stored thereon for processing data information, such that the instructions, when carried out by a processing device, cause the processing device to perform various operations. Such operations can include: receiving a memory access request at a first memory-mapped I/O device of a storage aggregation unit, the storage aggregation unit including multiple interconnected memory-mapped I/O devices, each memory-mapped I/O device having multiple Base Address Registers; in response to the memory access request identifying a physical address within a first Base Address Register of the first memory-mapped I/O device, executing the memory access request on the first memory-mapped I/O device; and in response to the memory access request identifying a physical address within a second Base Address Register of the first memory-mapped I/O device, redirecting the memory access request to a second memory-mapped I/O device, of the multiple interconnected memory-mapped I/O devices, and executing the memory access request on the second memory-mapped I/O device. Additional operations can include: in response to the memory access request identifying a physical address within a third Base Address Register of the first memory-mapped I/O device, redirecting the memory access request to a third memory-mapped I/O device, of the multiple interconnected memory-mapped I/O devices, and executing the memory access request on the second memory-mapped I/O device; in response to receiving a redirected memory access request at the second memory-mapped I/O device, the redirected memory access request identifying a physical address with a first Base Address Register of the second memory-mapped I/O device, executing the memory access request on the second memory-mapped I/O device; and in response to receiving a redirected memory access request at the second memory-mapped I/O device, the redirected memory access request identifying a physical address with a second Base Address Register of the second memory-mapped I/O device, redirecting the memory access request to a fourth memory-mapped I/O device, of the multiple interconnected memory-mapped I/O devices, and executing the memory access request on the fourth memory-mapped I/O device. Operations of the computer program product can also include: in response to receiving a mapping request, at the first memory-mapped I/O device of a storage aggregation device, for Base Address Register information corresponding to the first memory-mapped I/O device, identifying address ranges across three Base Address Registers fro the first memory-mapped I/O device sufficient to map physical data storage addresses from each of the multiple interconnected memory-mapped I/O devices, each additional memory-mapped I/O device identified via one level of Base Address Register indirection.

In different embodiments, computer system may be any of various types of devices, including, but not limited to, a cell phone, a personal computer system, desktop computer, laptop, notebook, or netbook computer, mainframe computer system, handheld computer, workstation, network computer, router, network switch, bridge, application server, storage device, a consumer electronics device such as a camera, camcorder, set top box, mobile device, video game console, handheld video game device, or in general any type of computing or electronic device. The computer system can include any graphical interfaces and input devices such as a keyboard, computer mouse, microphone, etc. Various interconnects can be used to couples a memory system, a processor, an I/O interface, and a communications interface to the computer system.

Embodiments can include communications interfaces that enable the computer system to communicate over a network and, if necessary, retrieve any data required to create views, process content, communicate with a user, etc. according to embodiments herein. The BAR driver can be embodied as software code such as data and/or logic instructions that support processing functionality according to different embodiments described herein. During operation of one embodiment, a processor accesses system memory via the use of interconnect 143 in order to launch, run, execute, interpret or otherwise perform the logic instructions of the BAR driver. It should be noted that, in addition to the BAR driver process that carries out method operations as discussed herein, other embodiments herein include the BAR driver itself (i.e., the un-executed or non-performing logic instructions and/or data). The BAR driver may be stored on a non-transitory, tangible computer-readable storage medium including computer readable storage media such as floppy disk, hard disk, optical medium, etc. According to other embodiments, the BAR driver can also be stored in a memory type system such as in firmware, read only memory (ROM), or, as in this example, as executable code within the memory system 141.

Those skilled in the art will also understand that there can be many variations made to the operations of the techniques explained above while still achieving the same functionality and benefits of the invention. Such variations are intended to be covered by the scope of this invention. As such, the foregoing descriptions of embodiments of the invention are not intended to be limiting. Rather, any limitations to embodiments of the invention are presented in the following claims.

The invention claimed is:

1. A data storage device comprising:
a storage aggregation unit that has multiple memory-mapped input/output (I/O) devices interconnected within the storage aggregation unit, each memory-mapped I/O device has multiple Base Address Registers, the storage aggregation unit includes a physical connection interface configured to connect to a computer bus;
the storage aggregation unit including a processor and a memory coupled to the processor, the memory storing instructions that, when executed by the processor, causes the storage aggregation unit to perform the operations of:
receiving a memory access request at a first memory-mapped I/O device of the storage aggregation unit;
in response to the memory access request identifying a physical address within a first Base Address Register of the first memory-mapped I/O device, executing the memory access request on the first memory-mapped I/O device; and
in response to the memory access request identifying a physical address within a second Base Address Register of the first memory-mapped I/O device, redirecting the memory access request to a second memory-mapped I/O device, of the multiple interconnected memory-mapped I/O devices, and executing the memory access request on the second memory-mapped I/O device.

2. The data storage device of claim 1, wherein the memory stores further instructions that, when executed by the processor, causes the storage aggregation unit to perform the operation of:
in response to the memory access request identifying a physical address within a third Base Address Register of the first memory-mapped I/O device, redirecting the memory access request to a third memory-mapped I/O device, of the multiple interconnected memory-mapped I/O devices, and executing the memory access request on the second memory-mapped I/O device.

3. The data storage device of claim 2, wherein the memory stores further instructions that, when executed by the processor, causes the storage aggregation unit to perform the operation of:
- in response to receiving a redirected memory access request at the second memory-mapped I/O device, the redirected memory access request identifying a physical address with a first Base Address Register of the second memory-mapped I/O device, executing the memory access request on the second memory-mapped I/O device; and
- in response to receiving a redirected memory access request at the second memory-mapped I/O device, the redirected memory access request identifying a physical address with a second Base Address Register of the second memory-mapped I/O device, redirecting the memory access request to a fourth memory-mapped I/O device, of the multiple interconnected memory-mapped I/O devices, and executing the memory access request on the fourth memory-mapped I/O device.

4. The data storage device of claim 1, wherein the memory stores further instructions that, when executed by the processor, causes the storage aggregation unit to perform the operation of:
- in response to receiving a mapping request, at the first memory-mapped I/O device of a storage aggregation device, for Base Address Register information corresponding to the first memory-mapped I/O device, identifying address ranges across three Base Address Registers fro the first memory-mapped I/O device sufficient to map physical data storage addresses from each of the multiple interconnected memory-mapped I/O devices, each additional memory-mapped I/O device identified via one level of Base Address Register indirection.

5. The data storage device of claim 4, wherein the mapping request is received as part of a boot sequence of an operating system.

6. The data storage device of claim 1, wherein each of the interconnected memory-mapped I/O devices is a solid-state drive.

7. The data storage device of claim 6, wherein each solid-state drive is configured with a respective PCIe function.

8. The data storage device of claim 7, wherein the memory access request is received from a corresponding operating system that recognizes individual memory-mapped I/O device functions without aggregating memory-mapped I/O devices via a central processing unit.

9. The data storage device of claim 1, wherein the memory access request is a request to write data at a location identified by one of the multiple Base Address Registers, and wherein each memory-mapped I/O device is a Peripheral Component Interconnect Express (PCIe) device.

10. A method comprising:
- receiving a memory access request at a first memory-mapped I/O device of a storage aggregation unit, the storage aggregation unit including multiple interconnected memory-mapped I/O devices, each memory-mapped I/O device having multiple Base Address Registers;
- in response to the memory access request identifying a physical address within a first Base Address Register of the first memory-mapped I/O device, executing the memory access request on the first memory-mapped I/O device; and
- in response to the memory access request identifying a physical address within a second Base Address Register of the first memory-mapped I/O device, redirecting the memory access request to a second memory-mapped I/O device, of the multiple interconnected memory-mapped I/O devices, and executing the memory access request on the second memory-mapped I/O device.

11. The method of claim 10, further comprising:
- in response to the memory access request identifying a physical address within a third Base Address Register of the first memory-mapped I/O device, redirecting the memory access request to a third memory-mapped I/O device, of the multiple interconnected memory-mapped I/O devices, and executing the memory access request on the second memory-mapped I/O device.

12. The method of claim 11, further comprising:
- in response to receiving a redirected memory access request at the second memory-mapped I/O device, the redirected memory access request identifying a physical address with a first Base Address Register of the second memory-mapped I/O device, executing the memory access request on the second memory-mapped I/O device; and
- in response to receiving a redirected memory access request at the second memory-mapped I/O device, the redirected memory access request identifying a physical address with a second Base Address Register of the second memory-mapped I/O device, redirecting the memory access request to a fourth memory-mapped I/O device, of the multiple interconnected memory-mapped I/O devices, and executing the memory access request on the fourth memory-mapped I/O device.

13. The method of claim 10, further comprising:
- in response to receiving a mapping request, at the first memory-mapped I/O device of a storage aggregation device, for Base Address Register information corresponding to the first memory-mapped I/O device, identifying address ranges across three Base Address Registers fro the first memory-mapped I/O device sufficient to map physical data storage addresses from each of the multiple interconnected memory-mapped I/O devices, each additional memory-mapped I/O device identified via one level of Base Address Register indirection.

14. The method of claim 13, wherein the mapping request is received as part of a boot sequence of a corresponding operating system.

15. The method of claim 10, wherein each of the interconnected memory-mapped I/O devices are solid-state drives.

16. The method of claim 10, wherein the memory access request is a request to write data at a location identified by one of the multiple Base Address Registers.

17. A computer program product including a non-transitory computer-storage medium having instructions stored thereon for processing data information, such that the instructions, when carried out by a processing device, cause the processing device to perform the operations of:
- receiving a memory access request at a first memory-mapped I/O device of a storage aggregation unit, the storage aggregation unit including multiple interconnected memory-mapped I/O devices, each memory-mapped I/O device having multiple Base Address Registers;
- in response to the memory access request identifying a physical address within a first Base Address Register of the first memory-mapped I/O device, executing the memory access request on the first memory-mapped I/O device; and
- in response to the memory access request identifying a physical address within a second Base Address Register of the first memory-mapped I/O device, redirecting the memory access request to a second memory-mapped I/O device, of the multiple interconnected memory-mapped I/O devices, and executing the memory access request on the second memory-mapped I/O device.

18. The computer program product of claim 17, having further instructions that when carried out by a processing device, cause the processing device to perform the operation of:

in response to the memory access request identifying a physical address within a third Base Address Register of the first memory-mapped I/O device, redirecting the memory access request to a third memory-mapped I/O device, of the multiple interconnected memory-mapped I/O devices, and executing the memory access request on the second memory-mapped I/O device.

19. The method of claim 18, having further instructions that when carried out by a processing device, cause the processing device to perform the operations of:

in response to receiving a redirected memory access request at the second memory-mapped I/O device, the redirected memory access request identifying a physical address with a first Base Address Register of the second memory-mapped I/O device, executing the memory access request on the second memory-mapped I/O device; and in response to receiving a redirected memory access request at the second memory-mapped I/O device, the redirected memory access request identifying a physical address with a second Base Address Register of the second memory-mapped I/O device, redirecting the memory access request to a fourth memory-mapped I/O device, of the multiple interconnected memory-mapped I/O devices, and executing the memory access request on the fourth memory-mapped I/O device.

20. The method of claim 17, having further instructions that when carried out by a processing device, cause the processing device to perform the operation of:

in response to receiving a mapping request, at the first memory-mapped I/O device of a storage aggregation device, for Base Address Register information corresponding to the first memory-mapped I/O device, identifying address ranges across three Base Address Registers fro the first memory-mapped I/O device sufficient to map physical data storage addresses from each of the multiple interconnected memory-mapped I/O devices, each additional memory-mapped I/O device identified via one level of Base Address Register indirection.

* * * * *